(12) United States Patent
Chuang

(10) Patent No.: US 11,720,260 B2
(45) Date of Patent: Aug. 8, 2023

(54) MEMORY ACCESS SYSTEM COMPRISING VOLATILE MEMORY, NON-VOLATILE MEMORY, PROCESSOR, AND PROGRAMMABLE LOGIC DEVICE AND MEMORY ACCESS METHOD THEREOF

(71) Applicant: Coretronic Corporation, Hsin-Chu (TW)

(72) Inventor: Ching-Sheng Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 78 days.

(21) Appl. No.: 17/138,905

(22) Filed: Dec. 31, 2020

(65) Prior Publication Data

US 2021/0208796 A1 Jul. 8, 2021

(30) Foreign Application Priority Data

Jan. 3, 2020 (CN) .......................... 202010004561.4

(51) Int. Cl.
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
CPC .... G06F 3/0622; G06F 3/0655; G06F 3/0679; G06F 12/0246; G06F 2212/7208
See application file for complete search history.

(56) References Cited

U.S. PATENT DOCUMENTS

| | | | |
|---|---|---|---|
| 9,703,697 B2 | 7/2017 | Krithivas et al. | |
| 2005/0219470 A1* | 10/2005 | Hsieh | H04N 5/7458 348/E5.142 |
| 2009/0210731 A1* | 8/2009 | Lakkapragada | H03K 19/17784 713/320 |
| 2019/0042757 A1* | 2/2019 | Ho | G06F 21/575 |
| 2019/0377569 A1* | 12/2019 | Harada | H04L 67/34 |

\* cited by examiner

*Primary Examiner* — Jane W Benner
(74) *Attorney, Agent, or Firm* — JCIPRNET

(57) ABSTRACT

A memory access method and a memory access system are provided. The memory access method is applicable to the memory access system. The memory access system includes a programmable logic device (PLD), a processor, a volatile memory, and a non-volatile memory. The PLD is disposed among the processor, the volatile memory, and the non-volatile memory. The memory access method includes: storing, by the PLD, data stored in the non-volatile memory to the volatile memory when the memory access system is started; and accessing, by the processor, the data from the volatile memory through the PLD.

18 Claims, 3 Drawing Sheets

MEMORY ACCESS SYSTEM COMPRISING VOLATILE MEMORY, NON-VOLATILE MEMORY, PROCESSOR, AND PROGRAMMABLE LOGIC DEVICE AND MEMORY ACCESS METHOD THEREOF

CROSS-REFERENCE TO RELATED APPLICATION

This application claims the priority benefit of China application serial no. 202010004561.4, filed on Jan. 3, 2020. The entirety of the above-mentioned patent application is hereby incorporated by reference herein and made a part of this specification.

BACKGROUND OF THE INVENTION

1. Field of the Invention

The invention relates to a memory access system and a memory access method.

2. Description of Related Art

A single electronic apparatus may be provided with a plurality of microcomputer units (MCUs) and a plurality of memory devices respectively corresponding to the different MCUs, to perform different tasks. FIG. 1 is a schematic diagram of an electronic apparatus 50 provided with a plurality of MCUs and a plurality of flash memories. The electronic apparatus 50 includes an MCU 11 and an MCU 21. The MCU 11 may be coupled to a corresponding flash memory device 12, and the MCU 21 may be coupled to a flash memory device 22 corresponding to the MCU 21. Data transmission between the MCUs and the flash memory devices may be performed by using a serial peripheral interface flash interface (SPIFI). For example, the MCU 11 and the flash memory device 12 may communicate with each other by using an SPIFI 31. In addition, communication between the MCUs needs to be implemented by using an inter-integrated circuit bus (I2C bus). For example, the MCU 11 may be communicatively connected to the MCU 21 by using an I2C bus 32, so as to access data of the flash memory device 22 by using the MCU 21.

However, a transmission rate of the I2C bus is relatively low. Therefore, it is inefficient for the MCU 11 to access the flash memory device 22 corresponding to the MCU 21 by using the I2C bus 32.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a memory access system and a memory access method, so that a processor may access memory space corresponding to another processor without any I2C bus.

The memory access system of the invention includes a volatile memory, a non-volatile memory, a processor, and a programmable logic device (PLD). The PLD is coupled to the processor, the volatile memory, and the non-volatile memory, and the PLD stores data stored in the non-volatile memory to the volatile memory when the memory access system is started. The processor accesses the data from the volatile memory through the PLD.

The memory access method of the invention is applicable to the memory access system. The memory access system includes a PLD, a processor, a volatile memory, and a non-volatile memory. The PLD is disposed among the processor, the volatile memory, and the non-volatile memory. The memory access method includes the following steps. Data stored in the non-volatile memory is stored to the volatile memory by the PLD when the memory access system is started. The data from the volatile memory is accessed by the processor through the PLD.

Based on the above, in the memory access system of the invention, the processor may access the segmentation of the memory corresponding to the second processor by using the PLD. There is no I2C bus between the processor and the segmentation of the memory. In other words, a transmission rate of data transmission between the processor and the segmentation of the memory is not decreased due to an I2C bus.

Other objectives, features and advantages of the invention will be further understood from the further technological features disclosed by the embodiments of the invention where there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
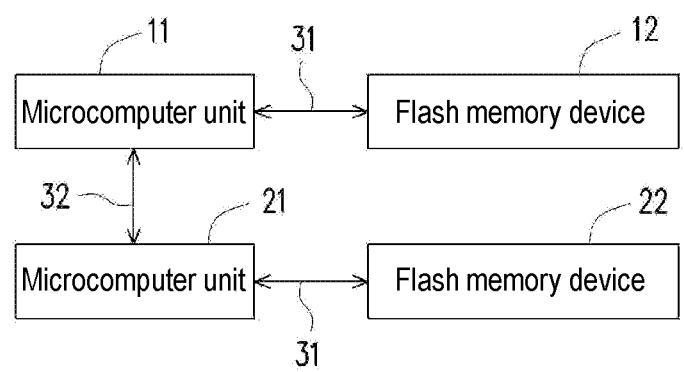
FIG. 1 is a schematic diagram of an existing electronic apparatus provided with a plurality of MCUs and a plurality of flash memories.
Figure 2:
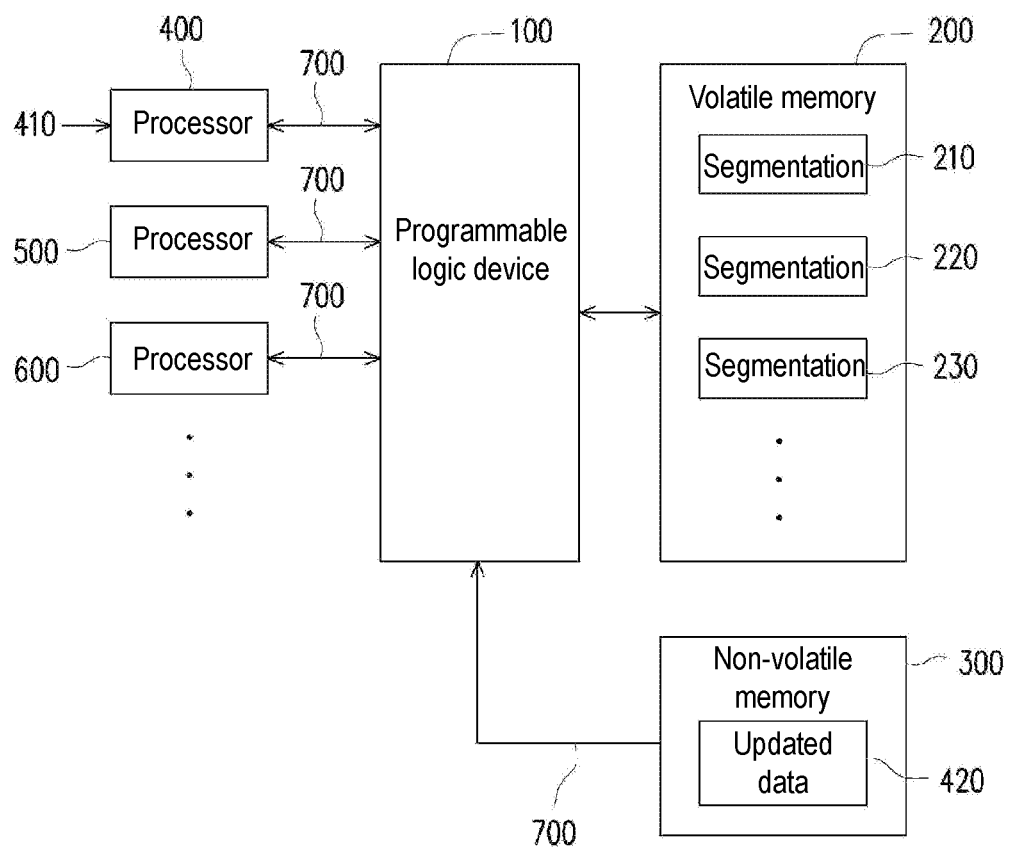
FIG. 2 is a schematic diagram illustrating a memory access system according to an embodiment of the invention.

FIG. 2 is a schematic diagram illustrating a memory access system 10 according to an embodiment of the invention. The memory access system 10 includes a PLD 100, a volatile memory 200, a non-volatile memory 300, and one or more processors. The one or more processors include a processor 400, a processor 500, and a processor 600. It should be noted that a quantity of the processors may be adjusted according to a requirement of a user. The invention is not limited thereto.

The PLD 100 may be, for example, a programmable array logic (PAL), a generic array logic (GAL), a complex PLD (CPLD), or a field programmable gate array (FPGA). The invention is not limited thereto. The PLD 100 is coupled to the volatile memory 200, the non-volatile memory 300, the processor 400, the processor 500, and the processor 600.

The volatile memory 200 may be, for example, a random access memory (RAM), a dynamic RAM (DRAM), or a static RAM (SRAM). The invention is not limited thereto. The volatile memory 200 may include a segmentation 210 corresponding to the processor 400, a segmentation 220 corresponding to the processor 500, and a segmentation 230 corresponding to the processor 600. The processor 400, the processor 500, and the processor 600 may respectively access data in the segmentation 210, the segmentation 220, and the segmentation 230 by using the PLD 100.

The non-volatile memory 300 may be, for example, a read-only memory (ROM), a flash memory, a hard disk drive (HDD), or a solid state drive (SSD). The invention is not limited thereto. The non-volatile memory 300 may be communicatively connected to the PLD 100 by using one of an SPIFI 700 and a parallel bus 700, to perform data transmission with the PLD 100.

The processor 400, the processor 500, or the processor 600 may be, for example, a central processing unit (CPU), another programmable MCU for a general purpose or a specific purpose, a microprocessor, a digital signal processor (DSP), an application-specific integrated circuit (ASIC), a graphics processing unit (GPU), other similar elements, or a combination of the elements described above. The processor 400, the processor 500, and the processor 600 may be respectively communicatively connected to the PLD 100 by using the SPIFI 700, so as to access the volatile memory 200 or the non-volatile memory 300 by using the PLD 100.

The non-volatile memory 300 stores data corresponding to the processors. For example, the non-volatile memory 300 may store firmware respectively corresponding to the processor 400, the processor 500, and the processor 600. When the memory access system 10 is started, the PLD 100 may store (or move) the firmware stored in the non-volatile memory 300 to the volatile memory 200. The processor 400, the processor 500, or the processor 600 may access, by using the PLD 100, corresponding firmware stored in the volatile memory 200 to perform firmware updating.

The volatile memory 200 may be configured for data transmission between the processors. For example, when the processor 400 intends to transmit data to the processor 500, the processor 400 does not need an I2C bus to transmit the data to the processor 500. The processor 400 may transmit the data to the PLD 100 by using the SPIFI 700 having a transmission rate higher than that of an I2C bus, so that the PLD 100 stores the data into the segmentation 220 of the volatile memory 200. Subsequently, the processor 500 may read the segmentation 220 corresponding to the processor 500 to obtain the data from the processor 400. Therefore, by using the memory access system 10 of the invention, data transmission between the processors is accelerated because no I2C bus is used, and the data does not need to be accessed by simultaneously consuming processing capabilities of the two processors.

In an embodiment, the PLD 100 may receive updated data from the processor 400 and update data in the non-volatile memory 300 according to the updated data. When updating the data in the non-volatile memory 300, the PLD 100 does not update data in the volatile memory 200 according to the updated data, and data transmission between the volatile memory 200 and the processors (namely, the processor 400, the processor 500, and the processor 600) is not interrupted.

When the user intends to update firmware of the processor 500 (or the processor 600), the user may first input updated data 410 of the firmware into the processor 400. Next, the processor 400 may transmit the updated data 410 to the non-volatile memory 300 by using the PLD 100, so that the non-volatile memory 300 updates, according to the updated data 410, the data stored in the non-volatile memory 300, to generate updated data 420.

After the processor 400 receives the updated data 410, before the memory access system 10 is restarted, the updated data 420 is not loaded into the volatile memory 200. Correspondingly, the processor 500 (or the processor 600) cannot read the updated data 420. Therefore, the processor 500 (or the processor 600) does not perform firmware updating to cause a task in process to be interrupted. When the memory access system 10 is restarted, the PLD 100 stores (or moves) the updated data 420 into the volatile memory 200, so that the processor 500 (or the processor 600 or the processor 400) may perform firmware updating according to the updated data 420. In other words, the user of the memory access system 10 may pre-load, into the non-volatile memory 300 without interrupting a task being performed by the processor 500 (or the processor 600), the updated data 410 used for updating firmware of one or more of the processor 500, the processor 600, and the processor 400, so that the corresponding one or more of the processor 500, the processor 600, and the processor 400 can automatically perform firmware updating when the memory access system 10 is restarted.

In an embodiment, the memory access system 10 is a projector system, the processor 500 is a digital micromirror device (DMD) chip, and the processor 600 is an image resolution chip. The processor 400 is configured to at least receive and process updated data. The segmentation 220 of the volatile memory 200 stores the firmware of the processor 500, and the segmentation 230 stores the firmware of the processor 600. The DMD chip is configured to manage an image display function of the projector system. For example, the DMD chip may control a plurality of micromirrors disposed on the surface of the DMD chip to reflect light and form an image. The image resolution chip is configured to manage a user interface or parameter adjustment function of the projector system. For example, the image resolution chip may pre-store a correction image to project the correction image when the projector system is started, so that the user may adjust, according to the correction image, parameters of an image projected by the projector system. The parameters are, for example, parameters such as brightness or an image size. Types and functions of the processors described above are not limited thereto. For example, the processor 400 may further be responsible for controlling a power supply of the projector system.

Referring to FIG. 2, the processor 500, the processor 600, or the processor 400 may respectively need to cooperate with non-volatile memories or volatile memories of different types in use to access data. For example, the processor 500, the processor 600, or the processor 400 needs to cooperate with a flash memory in use to access data, and the PLD 100 may collocate with the volatile memory 200 or the non-volatile memory 300 to simulate input/output settings of the flash memory during reading and writing. In this way, in the memory access system 10 of the invention, the volatile memory 200 or the non-volatile memory 300 of a single type may be used to replace volatile memories or non-volatile memories of a plurality of types, thereby effectively speeding up access to the memories by the processor 400, the processor 500, and the processor 600, and also preventing extra workload of modification caused by incompatibility between the processors and the memories in the memory access system 10. In addition, during hardware maintenance of the memory access system 10, in response to a shortage of the volatile memory or the non-volatile memory, the user may use a different volatile memory and non-volatile memory to replace the faulty volatile memory 200 or non-volatile memory 300.

That the PLD 100 may collocate with the volatile memory 200 to simulate input/output settings of the flash memory during reading and writing is specifically described as follows:

In an embodiment, the PLD 100 stores settings corresponding to different non-volatile memories. For example, the PLD 100 may store a first setting corresponding to the non-volatile memory 300 such as a flash memory, and a second setting corresponding to a non-volatile memory (referred to as a "second non-volatile memory" in the following) such as an SSD different from the non-volatile memory 300.

Specifically, when the non-volatile memory used by the memory access system 10 is the non-volatile memory 300, the processor 400 (or the processor 500 or the processor 600) may access the non-volatile memory 300 through the PLD 100 that is executed by using the first setting. When the user changes the non-volatile memory 300 of the memory access system 10 to the second non-volatile memory, the processor 400 (or the processor 500 or the processor 600) may access the second non-volatile memory through the PLD 100 that is executed by using the second setting. Parameters of the processor 400 (or the processor 500 or the processor 600) do not need to be adjusted to adapt to the new second non-volatile memory. In this way, during hardware maintenance of the memory access system 10, in response to a shortage of a type of the volatile memory 300, the user may use a non-volatile memory of a different type to replace the faulty non-volatile memory 300. It should be noted that the foregoing second setting may be pre-stored in the PLD 100, or may be generated through encoding performed on the PLD 100 by the user.

In an embodiment, the PLD 100 stores settings corresponding to different volatile memories. For example, the PLD 100 may store a first setting corresponding to the volatile memory 200 such as a DRAM, and a second setting corresponding to a volatile memory (referred to as a "second volatile memory" in the following) such as an SRAM different from the volatile memory 200. When the volatile memory used by the memory access system 10 is the volatile memory 200, the processor 400 (or the processor 500 or the processor 600) may access the volatile memory 200 through the PLD 100 that is executed by using the first setting.

Specifically, when the user changes the volatile memory 200 of the memory access system 10 to the second volatile memory, the processor 400 (or the processor 500 or the processor 600) may access the second volatile memory through the PLD 100 that is executed by using the second setting. Parameters of the processor 400 (or the processor 500 or the processor 600) do not need to be adjusted to adapt to the new second volatile memory. In this way, during hardware maintenance of the memory access system 10, in response to a shortage of a type of the volatile memory 200, the user may use a volatile memory of a different type to replace the faulty volatile memory 200. It should be noted that the second setting may be pre-stored in the PLD 100, or may be generated through encoding performed on the PLD 100 by the user.

In an embodiment, to further speed up access to the memories by the processors to improve operational efficiency, a volatile memory 200 with a relatively high speed, for example, a DRAM, may be selected to replace a non-volatile memory with a relatively low speed, for example, a flash memory, so that the processor 400, the processor 500, and the processor 600 may respectively access data in the segmentation 210, the segmentation 220, and the segmentation 230 inside the volatile memory 200 by using the PLD 100. When the memory access system 10 is shut down, the user may make a design according to a requirement to enable the PLD 100 to move necessary information stored in the volatile memory 200 to the non-volatile memory 300 for storage.

Specifically, in a case that the processor 500, the processor 600, or the processor 400 needs to cooperate with the flash memory in use to access data, when the volatile memory used by the memory access system 10 is a DRAM, the processor 400 (or the processor 500 or the processor 600) may access the DRAM (the volatile memory 200) through the PLD 100 that is executed by using the first setting. In the present embodiment, in a case that the non-volatile memory 300 used by the memory access system 10 is a flash memory, when receiving the updated data 410 of the firmware, the processor 400 may transmit the updated data 410 to the non-volatile memory 300 through the PLD 100 that is executed by using the second setting.

Figure 3:
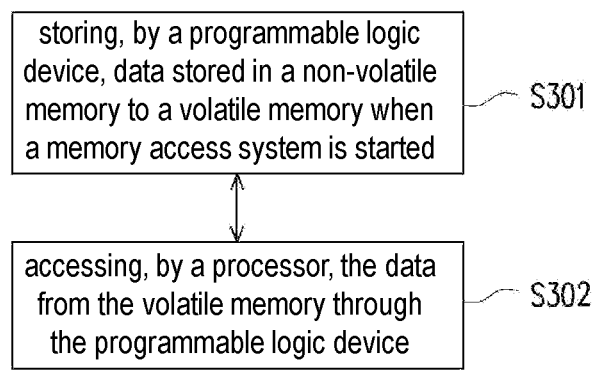
FIG. 3 is a flowchart of illustrating memory access method according to an embodiment of the invention.

In this way, in the memory access system 10 of the invention, parameters of the processor 400 (or the processor 500 or the processor 600) do not need to be adjusted to adapt to the DRAM when the volatile memory 200 with a relatively high speed is used to replace a non-volatile memory with a relatively low speed, thereby effectively speeding up access to the memories by the processor 400, the processor 500, and the processor 600, and also preventing an extra workload of modification caused by incompatibility between the processors and the memories in the memory access system 10. FIG. 3 is a flowchart illustrating a memory access method according to an embodiment of the invention. The memory access method may be implemented by the memory access system 10 shown in FIG. 2. In step S301, a PLD stores data stored in a non-volatile memory to a volatile memory when the memory access system is started. In step S302, a processor accesses the data from the volatile memory through the PLD.

Based on the above, in the memory access system of the invention, the data stored in the non-volatile memory may be loaded into the volatile memory after the system is started, so that each processor may perform data transmission by using a corresponding segmentation in the volatile memory. Because a data transmission rate of a volatile memory is higher than that of a non-volatile memory, the memory access system of the invention may effectively improve efficiency of the processor in performing a task. In addition, there is no I2C bus between the processor and a segmentation of a memory. In other words, a transmission rate of data transmission between the processor and the segmentation of the memory is not decreased due to an I2C bus. Moreover, the PLD may update data stored in the non-volatile memory when the memory access system is in a started state. Therefore, the processor may immediately obtain the updated data after the memory access system is restarted.

The foregoing descriptions are merely exemplary embodiments of the invention, and are not intended to limit the scope of the invention. Any simple equivalent changes and modifications that are made according to the claims of the invention or content of this specification shall still fall within the patent scope of the invention. In addition, any embodiment or claim of the invention does not need to achieve all the objectives, advantages, or features disclosed by the invention. In addition, the abstract and title are used only for assisting in searching for patent documents, and are not intended to limit the scope of rights of the invention. In addition, the terms "first", "second", and the like mentioned in this specification or the claims are merely used for naming elements or to distinguish between different embodiments or ranges, but are not intended to define the upper or lower limit of a quantity of the elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A memory access system, comprising a volatile memory, a non-volatile memory, a processor, and a programmable logic device (PLD), wherein
the PLD is coupled to the processor, the volatile memory, and the non-volatile memory, wherein the PLD is configured to store data stored in the non-volatile memory to the volatile memory when the memory access system is started,
the processor is configured to access the data from the volatile memory through the PLD,
the PLD stores a first setting corresponding to the non-volatile memory and a second setting corresponding to a second non-volatile memory, and
the processor is configured to access the non-volatile memory through the PLD that is executed by using the first setting or the second setting.

2. The memory access system according to claim 1, further comprising a second processor, the second processor coupled to the PLD, wherein the second processor is configured to access second data from the volatile memory through the PLD.

3. The memory access system according to claim 2, wherein the second processor is one of a digital micromirror device (DMD) chip and an image resolution chip, and the second data is firmware of the second processor.

4. The memory access system according to claim 2, wherein the volatile memory comprises a first segmentation corresponding to the processor and a second segmentation corresponding to the second processor.

5. The memory access system according to claim 1, wherein the PLD is configured to receive updated data from the processor to update the data in the non-volatile memory.

6. The memory access system according to claim 5, wherein the PLD is configured to store the updated data stored in the non-volatile memory to the volatile memory.

7. The memory access system according to claim 1, wherein the processor is configured to perform data transmission with the PLD by using one of a serial peripheral interface flash interface (SPIFI) and a parallel bus.

8. A memory access method, applicable to a memory access system, wherein the memory access system comprises a programmable logic device (PLD), a processor, a volatile memory, and a non-volatile memory, the PLD is disposed among the processor, the volatile memory, and the non-volatile memory, and the memory access method comprises:
storing, by the PLD, data stored in the non-volatile memory to the volatile memory when the memory access system is started;
accessing, by the processor, the data from the volatile memory through the PLD;
storing, by the PLD, a first setting corresponding to the non-volatile memory and a second setting corresponding to a second non-volatile memory; and
accessing, by the processor, the non-volatile memory through the PLD that is executed by using the first setting or the second setting.

9. The memory access method according to claim 8, further comprising:
accessing, by a second processor, second data from the volatile memory through the PLD, wherein the second processor is coupled to the PLD.

10. The memory access method according to claim 9, wherein the second processor is one of a digital micromirror device (DMD) chip and an image resolution chip, and the second data is firmware of the second processor.

11. The memory access method according to claim 9, wherein the volatile memory comprises a first segmentation corresponding to the processor and a second segmentation corresponding to the second processor.

12. The memory access method according to claim 8, wherein the PLD receives updated data from the processor to update the data in the non-volatile memory.

13. The memory access method according to claim 12, wherein the PLD stores the updated data stored in the non-volatile memory to the volatile memory.

14. The memory access method according to claim 8, wherein the processor performs data transmission with the PLD by using one of a serial peripheral interface flash interface (SPIFI) and a parallel bus.

15. A memory access system, comprising a volatile memory, a non-volatile memory, a processor, and a programmable logic device (PLD), wherein
the PLD is coupled to the processor, the volatile memory, and the non-volatile memory, wherein the PLD is configured to store data stored in the non-volatile memory to the volatile memory when the memory access system is started, and to store a first setting corresponding to the volatile memory and a second setting corresponding to a second volatile memory, and
the processor is configured to access the data from the volatile memory through the PLD, and to access the volatile memory through the PLD that is executed by using the first setting or the second setting.

16. A memory access system, comprising a volatile memory, a non-volatile memory, a processor, and a programmable logic device (PLD), wherein
the PLD is coupled to the processor, the volatile memory, and the non-volatile memory, wherein the PLD is configured to store data stored in the non-volatile memory to the volatile memory when the memory access system is started, and to store a first setting corresponding to the volatile memory and a second setting corresponding to the non-volatile memory, and
the processor is configured to access the data from the volatile memory through the PLD, and to access the volatile memory and the non-volatile memory through the PLD that is executed by using the first setting or the second setting.

17. A memory access method, applicable to a memory access system, wherein the memory access system comprises a programmable logic device (PLD), a processor, a volatile memory, and a non-volatile memory, the PLD is disposed among the processor, the volatile memory, and the non-volatile memory, and the memory access method comprises:
storing, by the PLD, data stored in the non-volatile memory to the volatile memory when the memory access system is started;
accessing, by the processor, the data from the volatile memory through the PLD;
storing, by the PLD, a first setting corresponding to the volatile memory and a second setting corresponding to a second volatile memory; and
accessing, by the processor, the volatile memory through the PLD that is executed by using the first setting or the second setting.

18. A memory access method, applicable to a memory access system, wherein the memory access system comprises a programmable logic device (PLD), a processor, a volatile memory, and a non-volatile memory, the PLD is disposed among the processor, the volatile memory, and the non-volatile memory, and the memory access method comprises:
storing, by the PLD, data stored in the non-volatile memory to the volatile memory when the memory access system is started;
accessing, by the processor, the data from the volatile memory through the PLD;
storing, by the PLD, a first setting corresponding to the volatile memory and a second setting corresponding to the non-volatile memory; and
accessing, by the processor, the volatile memory and the non-volatile memory through the PLD that is executed by using the first setting or the second setting.

\* \* \* \* \*